United States Patent [19]

Dischert

[11] 4,335,411
[45] Jun. 15, 1982

[54] LENGTH COUNTER FOR WEB TRANSPORT SYSTEM

[75] Inventor: William A. Dischert, Camden, N.J.

[73] Assignee: RCA Corporation, New York, N.Y.

[21] Appl. No.: 116,253

[22] Filed: Jan. 28, 1980

[51] Int. Cl.³ .................. G11B 15/18; G11B 15/48; B65H 23/08; B65H 59/00

[52] U.S. Cl. .................. 360/137; 360/72.3; 360/74.3; 242/75.1; 242/75.53

[58] Field of Search .............. 360/137, 72.3, 74.3; 242/188, 201, 75.1, 75.53

[56] References Cited

U.S. PATENT DOCUMENTS

| | | | |
|---|---|---|---|
| 2,498,476 | 2/1950 | Alfonso | 242/201 X |
| 3,032,285 | 5/1962 | Brede | 242/208 |
| 3,037,290 | 2/1967 | Kurth | 242/184 |
| 3,037,290 | 6/1962 | Dolby | 242/188 X |
| 3,284,084 | 11/1966 | Cooper | 360/74.3 |
| 3,515,391 | 6/1970 | Nakamura et al. | 242/188 X |
| 3,715,090 | 2/1973 | Kostusiak et al. | 242/188 |
| 4,095,732 | 6/1978 | Merritt | 360/72.3 |

*Primary Examiner*—Aristotelis M. Psitos
*Attorney, Agent, or Firm*—Eugene M. Whitacre; Paul J. Rasmussen; William H. Meise

[57] ABSTRACT

Within a web transport system of the type wherein the web travels between storage reels and a tachometer having a roller is disposed toward one end of the web path, a second roller is disposed towards the other end of the web path for cooperating with the tachometer to overcome the effects caused by the web tension differential on the tachometer roller when the web moves in opposite directions.

2 Claims, 6 Drawing Figures

LENGTH COUNTER FOR WEB TRANSPORT SYSTEM

BACKGROUND OF THE INVENTION

This invention relates to a length counter for use in a bidirectional web transport system, particularly such systems as are utilized in tape recorders. To locate portions of the web accurately in these transport systems, it is customary to measure the length of web that passes some reference point in either direction. Unique information is available continuously along the web in tape recording systems and that information can be either analog or digital and can relate to audio or video or data storage. Length measurement in a web transport system is usually obtained through a roller over which the web passes at one end of the web path. The web causes the roller to rotate in proportion to the length of web that passes thereover and the rotating roller drives an indicator that is calibrated in either time or length of web. The combination of the roller and indicator is commonly known as a counter or tachometer. At relatively low speeds, the rotation of the roller is a simple matter with the web being in intimate contact with the roller surface. However, as the speed of the web is increased an air cushion forms between the web and the roller. Slippage is thus introduced between the web and the roller and a false reading as to tape measurement often occurs.

In the prior art, various techniques have been utilized to overcome such web slippage. Grooves have been disposed in the surface of the roller to prevent the entrapment of air between the web and the roller. Also, a capstan roller with the web pressed firmly thereagainst by a pinch roller has been utilized as the tachometer roller to avoid such air entrapment. However, when the web is required to travel at very high speeds during shuttle modes of the transport such as for editing purposes in a video and/or audio tape recorder, the limited drive capability of the capstan can not be utilized and the pinch roller is disengaged therefrom to allow the web to move freely. Furthermore, such high speeds cause the web tension on the tachometer roller to be greater with the web moving in one direction than with the web moving in the other direction, even with grooves disposed in that roller. This is so because the tachometer roller must be located toward one end of the web path due to the record and replay heads which are located at approximately the center of the web path. Of course, this difference in web tension causes the tachometer to be inaccurate in the web direction for which the web tension at the roller is decreased.

SUMMARY OF THE INVENTION

Tachometer inaccuracies encountered in many web transport systems at very high web speeds are overcome by disposing another roller at the other end of the web path for cooperating with the tachometer to overcome the effects caused by the web tension differential on the tachometer roller when the web moves in opposite directions. Many embodiments are possible for providing such cooperation between the additional roller and the tachometer, with the simplest being to mechanically interconnect the tachometer roller and the additional roller so that the rotational velocity of both rollers is equalized in rotational velocity of both rollers is equalized in either direction of web travel. Such cooperation is provided in another embodiment by connecting the additional roller to drive a second tachometer and utilizing a comparator means for determining the more accurate tachometer reading from the readings of both tachometers. In still another embodiment, such cooperation is provided by connecting the additional roller to drive a second tachometer and utilizing a control means for enabling only one of the tachometers in accordance with which tachometer roller encounters the greater tape tension.

DESCRIPTION OF THE PREFERRED EMBODIMENTS

Figure 1:
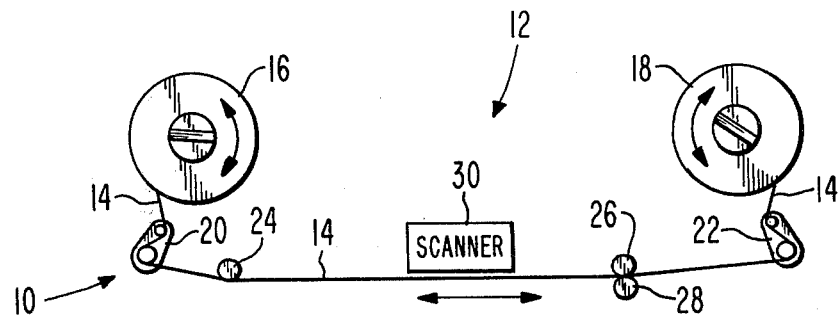
FIG. 1 illustrates the use of a prior art web transport system within a tape record and replay unit.

A prior art bidirectional web transport system 10 is shown within a simplified tape record and replay unit 12 in FIG. 1. Tape 14 travels between storage reels 16 and 18 at each end of the transport system 10, which rotate in accordance with the direction of tape travel. The tape 14 enters and leaves the reels 16 and 18 through conventional tensioning devices 20 and 22 respectively, and passes over a tachometer roller 24 and a capstan roller 26 in its path of travel. A pinch roller 28 presses the tape 14 against the capstan roller 26 and a scanner 30 is disposed in the tape path with heads (not shown) for recording and replaying information on the tape 14. As discussed previously, for high tape speeds the tape tension on the tachometer roller 24 is different in each direction of tape travel and due to tape slippage the tachometer is inaccurate for the direction of tape travel that produces the lower tape tension on the tachometer roller 24.

Figure 2:
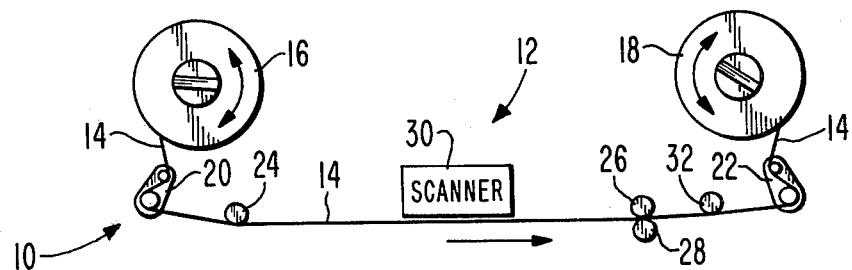
FIG. 2 shows the tape record and replay unit of FIG. 1 with the improvement of this invention incorporated therein.

The tape record and replay unit 12 of FIG. 1 is shown in FIG. 2 with the invention of this application incorporated therein. Another roller 32 over which the tape 14 passes is disposed toward the other end of the tape path opposite from the tachometer roller 24 for cooperating with the tachometer to overcome the effects caused by the tape tension differential on the tachometer roller 24 when the tape moves in opposite directions. The cooperation between roller 32 and the tachometer roller 24 may be accomplished in different ways within the scope of this invention as will be illustrated in the embodiments described hereafter.

Figure 3:
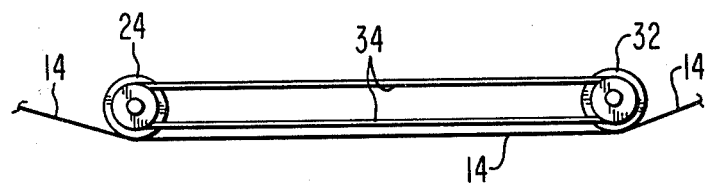
FIG. 3 illustrates one preferred embodiment of this invention.

In one preferred embodiment, the roller 32 cooperates with the tachometer through a mechanical interconnection such as the drive belt 34 shown in FIG. 3. The rotational velocity of the rollers 24 and 32 in either direction of tape travel is equalized through the belt 34 and therefore the accuracy of the tachometer is maintained even though the tape may travel periodically in each direction to cause a tape tension differential on the tachometer roller 24.

Figure 4:
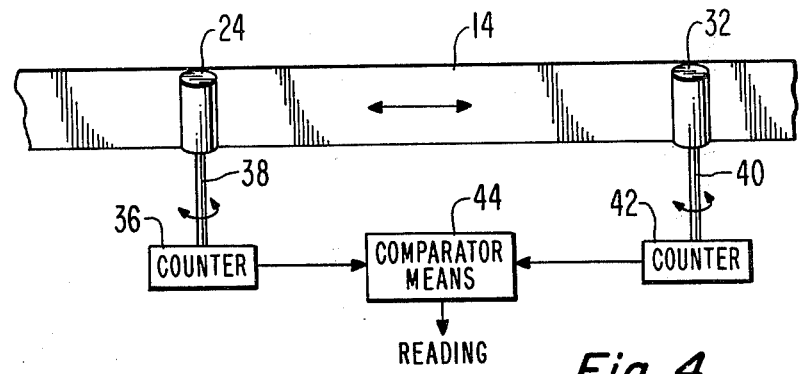
FIG. 4 illustrates another preferred embodiment of this invention.

Another embodiment of the invention is shown in FIG. 4 wherein the first tachometer includes a counter 36 which is driven by the roller 24 in some conventional manner, such as through a shaft 38. Roller 32 is also connected through a shaft 40 to drive a counter 42 within a second tachometer and cooperates with the first tachometer through a comparator means 44 for determining the more accurate tachometer reading from the outputs of the first and second tachometers. Since the first tachometer will be more accurate in one direction of tape travel and the second tachometer will be more accurate in the other direction of tape travel, comparator means 44 operates to sense the tachometer reading of faster change due to less slip between the roller 24 or 32 and the tape 14. Consequently, the comparator means 44 selects the more accurate output from the first and second tachometers when the tape is driven intermittently in both directions.

Figure 5:
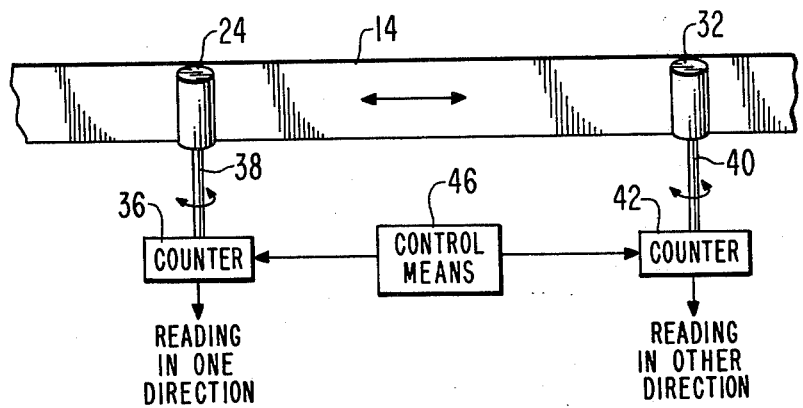
FIG. 5 illustrates still another preferred embodiment of this invention.

As shown in FIG. 5, still another embodiment is possible wherein the roller 32 drives the second tachometer and cooperates with the first tachometer through a control means 46 for enabling either the first or second tachometer in accordance with which tachometer roller 24 or 32 encounters the greater tape tension. Since roller 24 will encounter greater tape tension in one direction of tape travel and the roller 32 will encounter greater tape tension in the other direction of tape travel, control means 46 can be as simple as a switch located somewhere in the transport system to sense the direction of tape travel.

Figure 6:
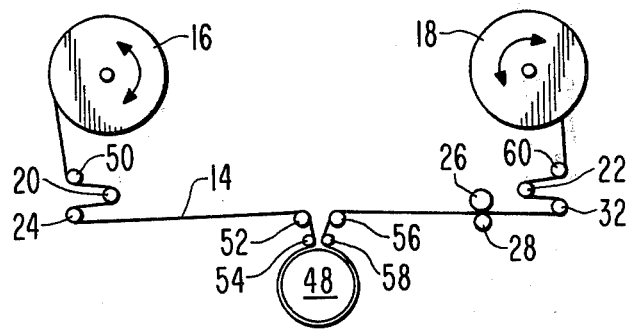
FIG. 6 shows a helical scan tape record and replay unit with the improvement of this invention incorporated therein.

Those skilled in the art will realize without further explanation that other embodiments are possible for the invention of this application. Also, the invention of this application relates generally to web transport systems even though it has only been disclosed within a tape transport system of a record and replay unit. Furthermore, this invention could be incorporated into the tape transport system of any type of record and replay unit and has been found to be particularly appropriate for use in helical scan record and replay units, as shown in FIG. 6. Numerical designations in FIG. 6 are the same as those of FIG. 1, except that a helical drum 48 replaces the scanner 30 and posts or idler rollers 50, 52, 54, 56, 58, and 60 are also included therein.

What I claim is:

1. In a capstan drive, bi-directional web transport system of the type wherein the web travels between storage reels and a first tachometer is disposed toward one end of the web path for measuring web travel in the system, and in which the first tachometer includes a first roller in contact with the web, the improvement comprising:
   a second roller disposed in contact with the web toward the other end of the web path and connected to drive a second tachometer whereby a different magnitude of slippage is encountered between each roller and the web for each direction of web movement to cause each tachometer to have a different accuracy for each direction of web movement, the second roller cooperating with the first roller through a comparator means for determining the more accurate tachometer reading from the readings of the first and second tachometers.

2. In a capstan drive, bi-directional web transport system of the type wherein the web travels between storage reels and a first tachometer is disposed toward one end of the web path for measuring web travel in the system, and in which the first tachometer includes a first roller in contact with the web, the improvement comprising:
   a second roller disposed in contact with the web toward the other end of the web path is connected to drive a second tachometer and a different magnitude of slippage is encountered between each roller and the web for each direction of web movement to cause each tachometer to have a different accuracy for each direction of web movement;
   means for determining which of the first or second roller encounters web slippage to a lesser degree; and
   control means coupled to the first and second tachometers for enabling either the first or second tachometer in accordance with which of the first or second roller encounters web slippage to a lesser degree.

* * * * *